(12) United States Patent
O'Keeffe et al.

(10) Patent No.: US 9,996,053 B2
(45) Date of Patent: Jun. 12, 2018

(54) NANO- AND MICRO-REPLICATION FOR AUTHENTICATION AND TEXTURIZATION

(75) Inventors: Sean Timothy O'Keeffe, Tustin, CA (US); Tran Quoc Pham, Anaheim, CA (US); Theodore Andrew Waniuk, Lake Forest, CA (US)

(73) Assignee: Crucible Intellectual Property, LLC, Rancho Santa Margarita, CA (US)

(*) Notice: Subject to any disclaimer, the term of this patent is extended or adjusted under 35 U.S.C. 154(b) by 335 days.

(21) Appl. No.: 14/345,883

(22) PCT Filed: Sep. 19, 2011

(86) PCT No.: PCT/US2011/052170
§ 371 (c)(1),
(2), (4) Date: May 22, 2014

(87) PCT Pub. No.: WO2013/043149
PCT Pub. Date: Mar. 28, 2013

(65) Prior Publication Data
US 2014/0293384 A1    Oct. 2, 2014

(51) Int. Cl.
| | |
|---|---|
| B21D 22/02 | (2006.01) |
| G03H 1/00 | (2006.01) |
| C22C 1/00 | (2006.01) |
| C22C 45/00 | (2006.01) |
| C22C 5/02 | (2006.01) |

(Continued)

(52) U.S. Cl.
CPC ......... *G03H 1/0011* (2013.01); *B21D 22/022* (2013.01); *C22C 1/002* (2013.01); *C22C 5/02* (2013.01); *C22C 5/04* (2013.01); *C22C 16/00* (2013.01); *C22C 30/02* (2013.01); *C22C 45/00* (2013.01); *C22C 45/001* (2013.01); *C22C 45/003* (2013.01); *C22C 45/10* (2013.01); *C22C 49/12* (2013.01); *Y10T 428/12993* (2015.01)

(58) Field of Classification Search
CPC ....... B21D 22/02; B21D 22/022; C22F 1/183; C22F 1/186; C22C 1/002; C22C 33/003; C22C 45/10; G03H 1/0011
See application file for complete search history.

(56) References Cited

U.S. PATENT DOCUMENTS

| | | |
|---|---|---|
| 4,762,678 A | 8/1988 | Dolgin |
| 5,288,344 A | 2/1994 | Peker et al. |

(Continued)

FOREIGN PATENT DOCUMENTS

| | | |
|---|---|---|
| CN | 1638891 | 7/2005 |
| CN | 101225501 | 7/2008 |

(Continued)

OTHER PUBLICATIONS

Jan Schroersa et al., "Thermoplastic blow molding of metals," Materials Today, vol. 14, No. 1-2, Jan.-Feb. 2011, pp. 14-19.

(Continued)

*Primary Examiner* — Edward Tolan
(74) *Attorney, Agent, or Firm* — Brownstein Hyatt Farber Schreck, LLP (57) ABSTRACT

Embodiments herein relate to forming nano- and/or micro-replication directly embossed in a bulk solidifying amorphous alloy comprising a metal alloy by superplastic forming of the bulk solidifying amorphous alloy at a temperature greater than a glass transition temperature (Tg) of the metal alloy.

25 Claims, 6 Drawing Sheets

(51) Int. Cl.
*C22C 5/04* (2006.01)
*C22C 16/00* (2006.01)
*C22C 30/02* (2006.01)
*C22C 45/10* (2006.01)
*C22C 49/12* (2006.01)

(56) References Cited

U.S. PATENT DOCUMENTS

| | | | |
|---|---|---|---|
| 5,368,659 | A | 11/1994 | Peker et al. |
| 5,618,359 | A | 4/1997 | Lin et al. |
| 5,735,975 | A | 4/1998 | Lin et al. |
| 5,896,642 | A * | 4/1999 | Peker .................. B21J 1/006 148/561 |
| 5,950,704 | A * | 9/1999 | Johnson ............... B22D 23/00 164/47 |
| 6,325,868 | B1 | 12/2001 | Kim et al. |
| 7,575,040 | B2 | 8/2009 | Johnson |
| 8,336,361 | B2 * | 12/2012 | Fahrenbach ........... B44B 5/009 283/67 |
| 8,480,864 | B2 | 7/2013 | Farmer et al. |
| 8,613,816 | B2 * | 12/2013 | Kaltenboeck .......... C21D 1/34 148/561 |
| 2003/0047248 | A1 * | 3/2003 | Peker .................. C22C 45/00 148/403 |
| 2004/0211222 | A1 * | 10/2004 | Hosoe ................. B29C 33/424 65/374.12 |
| 2008/0099175 | A1 | 5/2008 | Chu et al. |
| 2008/0241953 | A1 * | 10/2008 | Fish .................. B01L 3/5023 436/169 |
| 2009/0272172 | A1 * | 11/2009 | Jeng ................. B81C 1/00031 72/379.2 |
| 2009/0282888 | A1 * | 11/2009 | Munn ................. H01R 4/64 72/342.1 |
| 2010/0098967 | A1 * | 4/2010 | Schroers ............. C22C 45/00 428/600 |
| 2010/0294147 | A1 * | 11/2010 | Loiret-Bernal ....... B41F 19/068 101/41 |
| 2010/0301004 | A1 | 12/2010 | Heidari |
| 2011/0287223 | A1 * | 11/2011 | Victor ................. C23C 30/00 428/147 |
| 2012/0297856 | A1 * | 11/2012 | Keil ................. B82Y 10/00 72/379.2 |
| 2013/0139964 | A1 * | 6/2013 | Hofmann .............. G02B 5/08 156/330 |
| 2014/0334106 | A1 * | 11/2014 | Prest ................. C22C 45/00 361/718 |
| 2015/0158067 | A1 * | 6/2015 | Kumar ................ B29C 43/003 72/202 |

FOREIGN PATENT DOCUMENTS

| | | |
|---|---|---|
| CN | 101675174 | 3/2010 |
| CN | 102101233 | 6/2011 |
| JP | 2001303218 | 10/2001 |
| JP | A2005515898 | 6/2005 |
| JP | A2006122918 | 5/2006 |
| JP | A2007164068 | 6/2007 |
| JP | A2008112541 | 5/2008 |
| JP | A2008173914 | 7/2008 |
| JP | A2009096115 | 5/2009 |
| WO | 2008/100583 | 8/2008 |
| WO | 2012/006571 | 1/2012 |

OTHER PUBLICATIONS

International Search Report and Written Opinion, PCT/ISA/210, PCT/ISA/220, PCT/ISA/237, dated Jul. 6, 2012, total of 14 pages.
Inoue et al., Bulk amorphous alloys with high mechanical strength and good soft magnetic properties in Fe—TM—B (TM=IV-VIII group transition metal) system, *Appl. Phys. Lett.*, 71 (4), 1977, pp. 464-466.
Shen et al., Bulk Glassy $Co_{43}Fe_{20}Ta_{5.5}B_{31.5}$ Alloy with High Glass-Forming Ability and Good Soft Magnetic Properties, Materials Transactions, vol. 42, No. 10, 2001, pp. 2136-2139.
Liu Quankun, *Basic Principle of Material Shaping*, Jan. 2005, p. 133, Mechanical Engineering Press (In Chinese with English translation—3 pages total).

* cited by examiner

NANO- AND MICRO-REPLICATION FOR AUTHENTICATION AND TEXTURIZATION

FIELD OF THE INVENTION

The present invention relates to nano- and micro-replication of bulk-solidifying amorphous alloys and methods of making the same.

BACKGROUND

Nano- and micro-replication is currently used for polymers. Nano- and micro-replication technology could be used to mass-produce precise structures in a variety of polymer films. This proprietary technology of companies such as Avery Dennison Corporation and 3M uses heat and pressure to liquefy a polymer and then reform it into extremely precise microstructures in a continuous, repeating pattern—often in the form of tiny protrusions, depressions, ridges or holes. Micro-replication provides micron-scale precision, high-structure density, high volume and low cost. Micro-replicated products could be used in a variety of products, including consumer products, health care, electronics, flat panel displays and micro electric-mechanical systems—to create a variety of micro-replicated product solutions.

However, currently there is no technology to form nano- and micro-replications such as holograms in metals like that available for making the same in polymer films. The conventional way of putting a hologram on a metal device is by first printing a hologram having holographic images on a piece of paper or sticker and then taping the paper or sticker on the metal surface of the device. However, by this method, one can remove the hologram from one device and put it on another device. Alternatively, if one wants to put the holographic images on the device itself without a sticker one needs to remove the components out of the device because the fabrication process involves some kinds of a wet process like etching. Therefore, there is a need to solve these problems by being able to put a hologram or something similar without having to remove the internal component of the device and make the hologram non-removable from the device.

Accordingly, there is a need to develop replication technology to mass-produce precise nano- and micro-scale structures e.g., holograms, directly embossed in a metal device without a wet process and without having to remove any component from the device, for example, the components of a cell phone.

SUMMARY

A proposed solution according to embodiments herein for nano- and micro-replication in metals is to use bulk-solidifying amorphous alloys. The embodiments herein include methods for forming nano- and/or micro-replication directly embossed in a bulk solidifying amorphous alloy comprising a metal alloy by superplastic forming of the bulk solidifying amorphous alloy at a temperature greater than a glass transition temperature (Tg) of the metal alloy.

BRIEF DESCRIPTION OF THE DRAWINGS

FIGS. 6(A, B and C) provides a schematic of a process of metallic master fabrication.

FIGS. 7(A, B, C and D) provides a schematic of a master used for providing metallic stamp replication.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
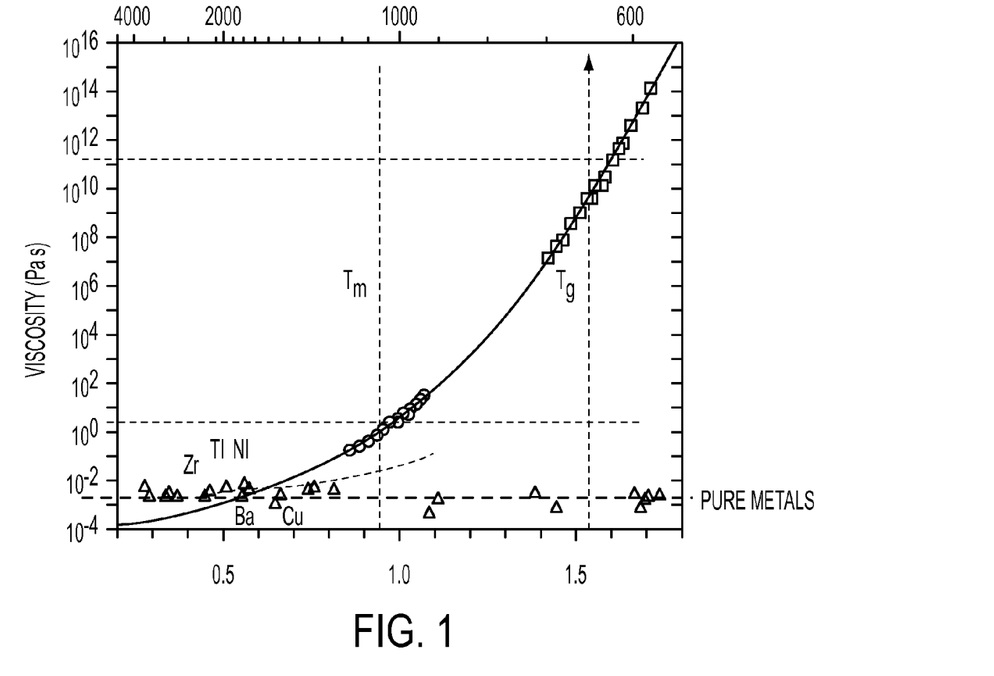
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
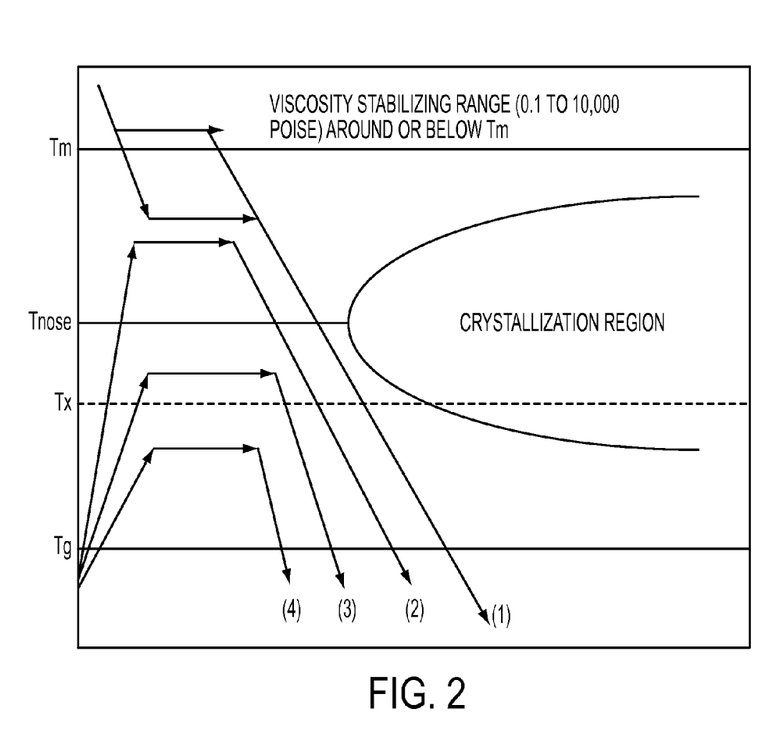
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 1(*b*), Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substeantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x, x')=\langle s(x), s(x')\rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

TABLE 1

Exemplary amorphous alloy compositions

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | Sn 0.50% | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Au 49.00% | Ag 5.50% | Pd 2.30% | Cu 26.90% | Si 16.30% | |
| 13 | Au 50.90% | Ag 3.00% | Pd 2.30% | Cu 27.80% | Si 16.00% | |
| 14 | Pt 57.50% | Cu 14.70% | Ni 5.30% | P 22.50% | | |
| 15 | Zr 36.60% | Ti 31.40% | Nb 7.00% | Cu 5.90% | Be 19.10% | |
| 16 | Zr 38.30% | Ti 32.90% | Nb 7.30% | Cu 6.20% | Be 15.30% | |
| 17 | Zr 39.60% | Ti 33.90% | Nb 7.60% | Cu 6.40% | Be 12.50% | |
| 18 | Cu 47.00% | Ti 34.00% | Zr 11.00% | Ni 8.00% | | |
| 19 | Zr 55.00% | Co 25.00% | Al 20.00% | | | |

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region could be used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Structures Having Nano- and Micro-Replications

There are advantages in the fabrication of complicated and intricate designs in structures and components using bulk solidifying amorphous alloys. The shrinkage of bulk solidifying amorphous alloys during casting or molding is very small; therefore, the as cast component can be used with minimal post-finishing. Furthermore, geometric factors such as ribs can be incorporated into the structure for better structural integrity. The bulk-solidifying amorphous alloy structures having nano- and/or micro-replications and components can be fabricated by either casting the amorphous alloys or molding the amorphous alloys.

Bulk amorphous alloys retain their fluidity from above the melting temperature down to the glass transition temperature due to the lack of a first order phase transition. This is in direct contrast to conventional metals and alloys. Since, bulk amorphous alloys retain their fluidity, they do not accumulate significant stress when cooled from their casting temperatures down to below the glass transition temperature, and as such dimensional distortions from thermal stress gradients can be minimized. Accordingly, intricate structures with large surface area and small thickness can be produced cost-effectively.

One exemplary method for producing nano- and micro-replications in structures using a molding process comprises the following steps.
1) Providing a sheet feedstock of amorphous alloy being substantially amorphous, and having an elastic strain limit of about 1.5% or greater and having a ΔT of 30° C. or greater;
2) Heating the feedstock to around the glass transition temperature;
3) Forming nano- and/or micro-replication in the heated feedstock;
4) Cooling the formed component to temperatures far below the glass transition temperature; and
5) Final finishing.

Preferably ΔT of the provided amorphous alloy is greater than 60° C., and most preferably greater than 90° C. Moreover, the time and temperature of the heating and shaping operation is selected such that the elastic strain limit of the amorphous alloy is substantially preserved to be not less than 1.0%, and preferably not being less than 1.5%. In the context of the embodiments herein, temperatures around glass transition means the forming temperatures can be below glass transition, at or around glass transition, and above glass transition temperature and below the melting temperature Tm, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Figure 3A:
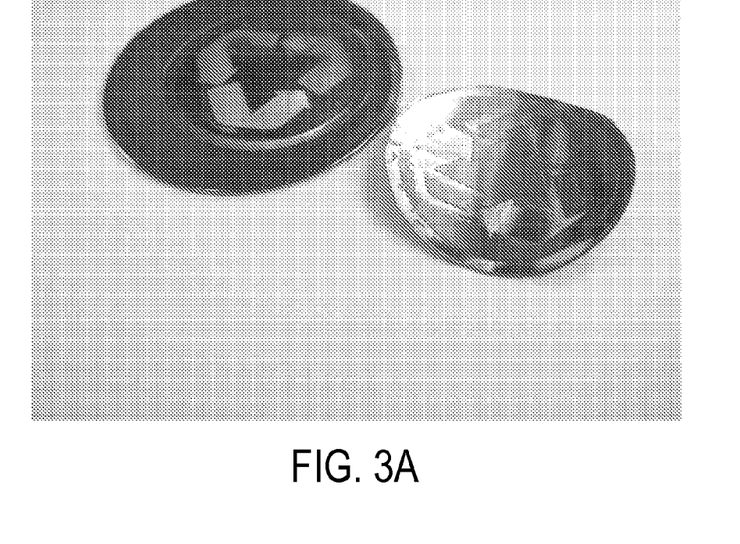
FIGS. 3(a) and 3(b) show photographs of a holographic image replicated onto a bulk-solidifying amorphous alloy obtained from Liquidmetal Technologies.
Figure 3B:
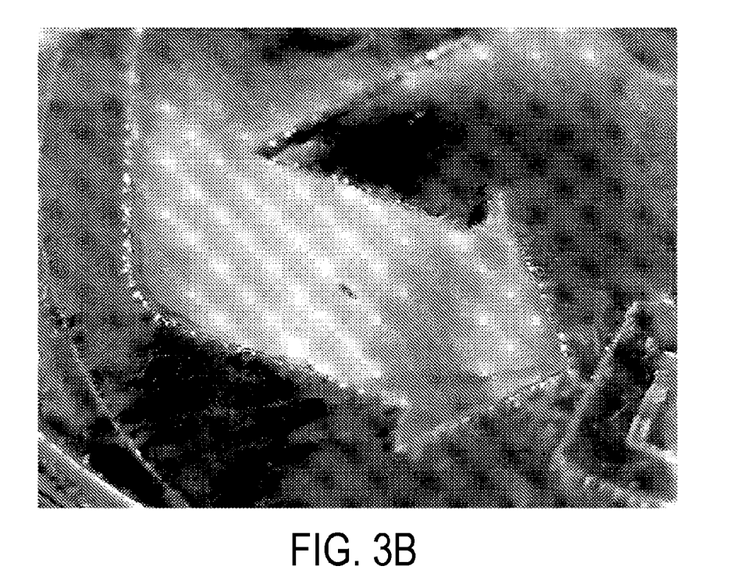

In one embodiment, the nano- and/or micro-replication was carried out in a mold that is made out of nickel alloy. A hologram was made on this mold, which was heated up to about 445° Celsius, within the supercooled liquid region of a bulk-solidifying amorphous alloy called LiquidMetal 1B. FIGS. 3(a) and 3(b) show photographs of a holographic image replicated onto a bulk-solidifying amorphous alloy LiquidMetal 1B obtained from Liquidmetal Technologies.

For general purposes one could heat the mold up to within the super cool liquid region within Tg and Tm or Tg and Tx of the amorphous alloy. One can use the mold to create a replication on a bulk-solidifying amorphous alloy part by applying pressure on the bulk-solidifying amorphous alloy, and the pressure can range from a few pounds to a few hundred pounds to a few thousands pounds. One does need to apply a lot of force such as that for stamping a shell metal made of a crystalline material. The force would proportional to the surface area of the hologram. If you have a small hologram, you can use less force than a larger hologram. In one embodiment, one even need not heat up the bulk-solidifying amorphous alloy. Instead, one could just heat up the mold and the mold can hold enough thermal energy that would heat up localized surface of the bulk-solidifying amorphous alloy and create a nano- and/or micro-replication of the mold with the hologram or any other feature in the bulk-solidifying amorphous alloy.

The embodiments herein further relate to a nano-replication of bulk-solidifying amorphous alloys with a mold like a stamping device that not like a die casting mold but more like a regular rubber stamp. So basically, one could have a stamp with the micro feature on the stamp, heat the stamp, press the stamp on a bulk-solidifying amorphous alloy and replicate the micro feature by embossing it directly on the surface of the bulk-solidifying amorphous alloy.

One novel feature of the embodiments is that one can get rid of wet processing or laser processing as conventionally required for forming micro-replications on a metal surface. Right now in order for a manufacturer to create a hologram on a metal surface one needs to do it with either laser or etch the surface using the photo lithography process, which is a wet process. It is very difficult to laser a hologram on a metal surface because the surface needs to be smooth to reflect the light. Also, as the feature of the hologram has a depth, the laser has to etch up to the depth to create a hologram. However, it is very difficult for a laser to etch up to the depth of a hologram. A hologram is basically a series of parallel channels, where the light comes in and the light reflects back. Most of the time, when the laser is burning on the surface, one does not get the smoothness and good reflection of a metal surface required of a good hologram. Generally, one can only create the texture of a hologram on a metal surface using a laser, but not the hologram itself with a laser. Therefore, the negative image of the hologram on the mold made by laser etching would generally have the texture and features of the hologram embossed on the bulk-solidifying amorphous alloy, but would not be a hologram itself. That is why most of the holograms on a metal surface were created by etching and electro-polishing afterwards. It does require a lot of steps to create a hologram on a metal surface. According to the embodiments, once one has created the mold, one can repeatedly use the mold, similar to a rubber stamp. One can literally just stamp the hologram into the surface of bulk-solidifying amorphous alloy portion of a part that one wants to create the hologram in and that is it.

The hologram on the bulk-solidifying amorphous alloy would be the same as that on the mold. However, the process by the embodiments is simpler and the hologram on the part is more secure. With a stamped hologram, one can just stamp the hologram on a metal surface of a device such as a computer or cell phone, and nobody can then remove the hologram unlike currently when hologram made on a sticker and pasted to a device can be peeled off, and therefore there is no way that you can tell that if it is a real authentication or a fake one. By the embodiments, the hologram would be a permanent deformation on the surface of a bulk-solidifying amorphous alloy that nobody can remove it.

Another novel feature is a part having a portion comprising a bulk solidifying amorphous alloy, wherein the bulk-solidifying amorphous alloy contains a nano- and/or micro-replication such as a hologram directly embedded therein. If the bulk solidifying is a material that reacts with oxygen or nitrogen under the forming temperature, like for example zirconium alloy, or titanium, zirconium based alloy, then one may need to carry out the process under the inert atmosphere. But if the bulk-solidifying amorphous alloys comprise alloys having a platinum base, a gold base, or a precious metal base, one does not really need to carry out the nano- or micro-replication under inert atmosphere. For one of the experiments, holograms were formed on a zirconium based bulk-solidifying amorphous alloy in air, and as long as there was no oxide formation on the surface of the zirconium based bulk-solidifying amorphous alloy, there was no need to perform the process under vacuum or in the atmosphere because the process was so fast and the temperature was not that high to cause any degradation of the zirconium based bulk-solidifying alloy. Similarly, titanium based bulk-solidifying amorphous alloys probably too do not need to be processed in vacuum or an inert environment.

In embodiments herein, thermoplastic forming of nanometer and micrometer scale features (logos, holograms, patterns, etc.) could be used as a means of detecting a counterfeit product and/or producing a unique texture to a final product. The substrate on which these features are embossed would be made of a bulk-solidifying amorphous alloy with a desired geometry. The features can be impressed or embossed onto the surface of the bulk-solidifying amorphous alloy, previously formed (through casting or other means) by utilizing thermoplastic forming. The equipment required for thermoplastic forming could be a hydraulic press with control of displacement and pressure of the platens applying the load and a proper fixture to hold the part.

The advantages of the embodiments herein are as follows. If an amorphous alloy product such as a bulk-solidifying amorphous alloy part requires some means of validating its authenticity it can be readily done by the method disclosed herein. To create a feature of this scale in any other machined or cast material would be expensive, difficult and/or impossible. A complex surface feature could be applied quickly using an amorphous alloy. The method could also be used to texturize a final product's surface with a unique design such as a holographic surface.

Fabrication of Molds to Make Structures Having Nano- and Micro-Replications

The types of molds and methods of manufacturing the molds used for making structures having nano- and/or micro-replications are disclosed in U.S. Pub. No. 2010/0301004, entitled "FABRICATION OF METALLIC STAMPS FOR REPLICATION TECHNOLOGY," incorporated herein in its entirety by reference. Portions of U.S. Pub. No. 2010/0301004 reproduced herein.

U.S. Pub. No. 2010/0301004 discloses a method and a process to produce desired nano size patterns in a conductive layer. This conducting layer acts as a seed-layer in subsequent electroplating process to produce a nickel stamp. In general the conductive layer can be conductive polymers or metals that are suitable in nickel-electroplating process.

Figure 4:
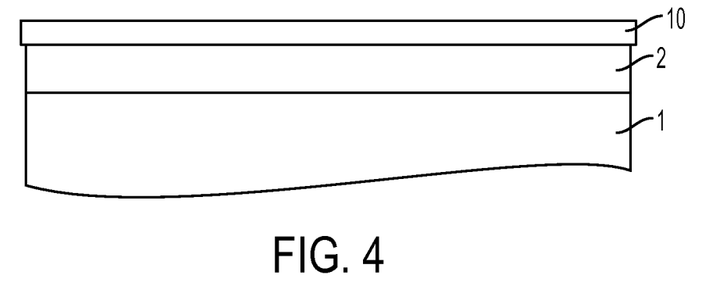
FIG. 4 provides a schematic of a substrate base with a conducting layer and a resist layer.
Figure 5:
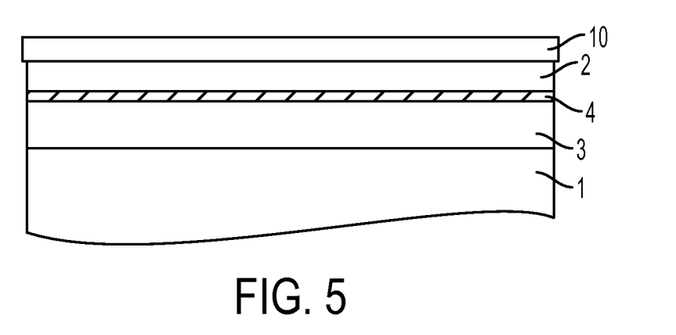
FIG. 5 provides a schematic of a substrate base with two conducting layers, a third conducting layer which acts as an etch-stop layer and a resist layer.

FIG. 4 (obtained from U.S. Pub. No. 2010/0301004) shows the substrate base 1 with a conducting layer 2 and a resist layer 10, and FIG. 5 (obtained from U.S. Pub. No. 2010/0301004) is the substrate base 1 with two conducting layers 2 and 3, third conducting layer 4 which act as etch-stop layer and a resist layer 10.

FIG. 6 (obtained from U.S. Pub. No. 2010/0301004) shows the process of metallic master fabrication of single and multiple conductive layers. For the single conductive layer, A-1 shows a pattered resist layer 10 on a conductive e.g. titanium layer 2, B-1 shows the etched structures 20 in the conductive layer e.g. titanium 2 using resist 10 as an etch mask, and C-1 shows the conductive master after removing off the resist and for multiple conductive layers. A-2 show pattered resist layer 10, using two conductive layers e.g. Titanium 2,3 and a third conductive layer e.g. gold 4 in-between. Moreover, B-2 shows etched structures 20 in the conductive layer e.g. titanium 2 limited to the etch-stop layer 4 using resist 10 as an etch mask, and C-2 shows the multi-layer conductive master, after removing off the resist.

FIG. 7 (obtained from U.S. Pub. No. 2010/0301004) shows the metallic master used for providing metallic stamp replication. A is the process of electroplating a Nickel father 100 on the master 1,2 for the single layer or 1,3,4,2 for the multiple layers B is the Nickel-father-stamp 100 after separation from the master, C) is the electroplated Nickel-mother 200 on Nickel-father-stamp 100, and D is the electroplated Nickel-mother-stamp 200 after separation of the Nickel-father-stamp.

The different process steps for manufacturing the metallic master shown in FIG. 7 are as follows: deposition of high quality and uniform conductive layer, patterning of the features (this can be made through different types of lithography) and etching of the features into conductive layer after the lithography step, in order to reach the target etch depth, as well as the sidewall angles of the structure, (e.g. about 85 degrees).

Figure 6A:
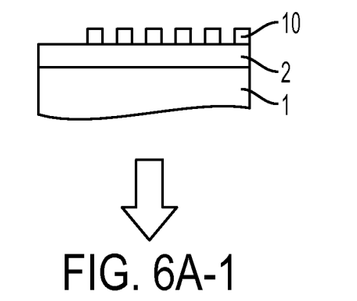
Figure 6A:
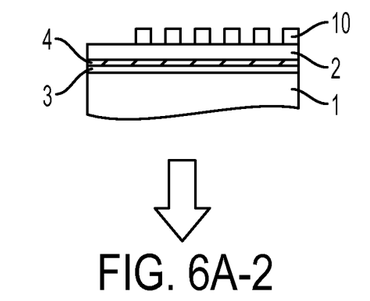
Figure 6B:
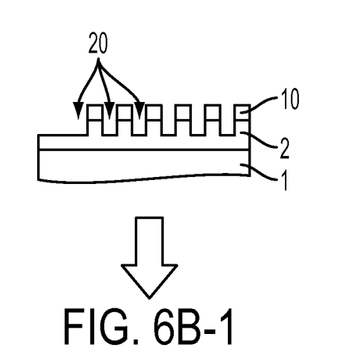
Figure 6B:
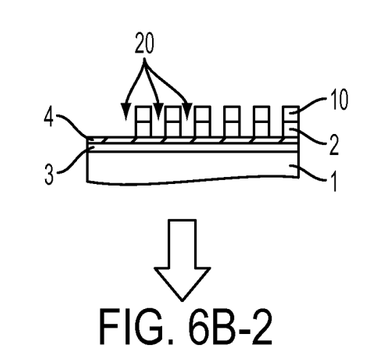
Figure 6C:
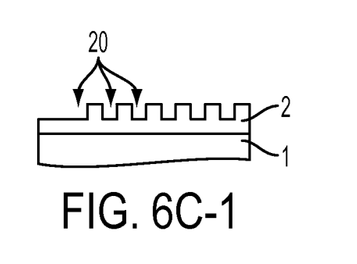
Figure 6C:
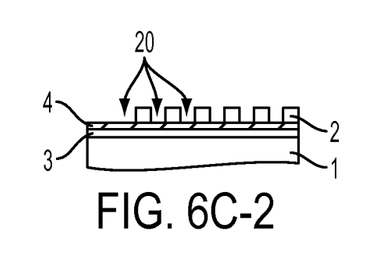
Figure 7A:
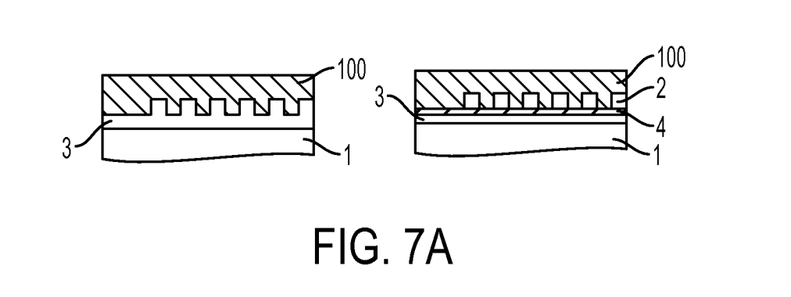
Figure 7B:
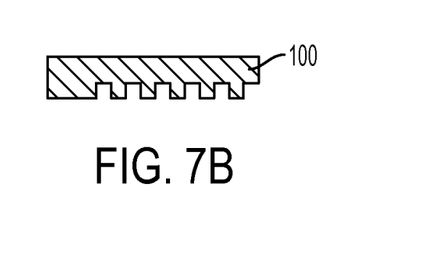
Figure 7C:
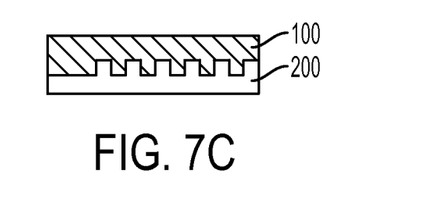
Figure 7D:
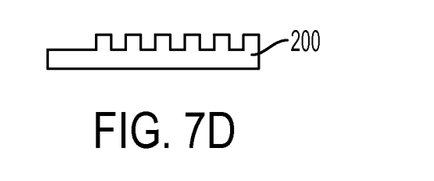

E-beam evaporation or sputtering technique could be used to form a thin metal film 2, 3, 4, e.g. (300 nm, Ti), as conducting foundation layer 2. The nano features are transferred to the foundation layer 2 in FIG. 6 by, e.g. Electron Beam Lithography (EBL), followed by a suitable Reactive Ion Etching (RIE) process. This conductive foundation layer 2 e.g. Ti, includes three-dimensional structures which are mechanically and chemically stable. The conductive foundation layer 2 e.g. Ti, servea as a working electrode in the subsequent electrodeposition of the Ni-metal. After electroplating, nickel imprint stamps (nickel-father stamps) 100 are obtained by peeling the Ni metal films off the metallic Ti-master. Very low adhesion between Ti and Ni makes it possible to delaminate the Ni-stamp from Ti-master without any defects. Initial tests have shown that Titanium thin film 2 survived several nickel-electroplating cycles with repeatable results which makes this metal a good candidate for this application.

Replication processes have been developed to produce nickel stamps 100,200 which involve lithography, etching and electrochemical deposition on a conducting base layer. The conductive masters shown in FIG. 7 can be made of, e.g. titanium, platinum, silicon carbide, gold, silver and diamond like carbon, which can be used several times to replicate Ni stamps 100 through electroplating, and each replicated stamp (Nickel father stamp) 100 in turn can be used in a family plating process producing second generation nickel stamps (Nickel mother stamp) 200. The present method suggests cost effective patterning on a conductive layer e.g. metals and/or conductive polymer layer for nano size conductive master fabrication and replications thereof.

After a replication of Ni film from the Ti-master (FIG. 7), the structures are mechanically stable due to the good mechanical durability of the Ti and its strong adhesion to the substrate base. The master pattern can be reused.

Holograms Embossed Directly on Bulk-Solidifying Amorphous Alloys

Holography is a technique that allows the light scattered from an object to be recorded and later reconstructed so that when an imaging system (a camera or an eye) is placed in the reconstructed beam, an image of the object will be seen even when the object is no longer present. By the embodiments herein, it is possible to form holograms directly in a bulk-solidifying amorphous alloys as shown in FIGS. 3(a) and 3(b) using a hot stamping process. The holograms can be transferred to a wide variety of articles wherein at least a portion of which is made of an amorphous alloy such as a bulk-solidifying amorphous alloy. The article could be in the form of paper or a part of a component such as the enclosure of an electronic device, e.g., a cell phone or a computer. Holography hot stamping could be used on all kinds of products such as packaging, greeting cards, gifts, stationery, calendars, book covers, credit cards, among others. When incorporated with a custom design pattern or logo, holography hot stamping of amorphous alloys could be used as security foils that protect credit cards, passport, and value documents from counterfeit. When the hologram on an amorphous alloy formed by superplastic forming is illuminated by a laser beam, a reconstructed image of the object is obtained.

What is claimed:

1. A method comprising:
heating a mold defining a pattern of micro-scale or smaller features to a temperature at or above a glass transition temperature (Tg) and below a melting temperature (Tm) of a bulk solidifying amorphous alloy;
placing the heated mold and an article comprising the bulk solidifying amorphous alloy at a temperature below Tg in contact with each other to locally heat the article so that a depth less than a complete thickness of the article is heated to at least Tg and a remainder of the article remains below Tg; and
imprinting the pattern on the article.

2. The method of claim 1, wherein the operation of imprinting comprises stamping the article with the mold.

3. The method of claim 1, wherein the pattern corresponds to a negative image of a hologram.

4. The method of claim 1, wherein the article is at ambient temperature prior to placing the heated mold in contact with the article.

5. The method of claim 1, further comprising applying force on the mold to imprint the pattern on the article.

6. The method of claim 5, further comprising cooling the locally heated portion of the article below Tg while maintaining the force on the mold after imprinting the pattern.

7. The method of claim 1, wherein the bulk solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

8. The method of claim 1, wherein the bulk solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

9. The method of claim 1, wherein the bulk solidifying amorphous alloy can sustain strains up to 1.5% or more without any permanent deformation or breakage.

10. The method of claim 1, wherein the method is carried out without wet processing.

11. The method of claim 1, wherein the method is carried out without laser etching.

12. The method of claim 1, further comprising processing the bulk solidifying amorphous alloy to form the article, wherein the processing is performed in a manner such that a time-temperature profile during the processing does not traverse through a region bounding a crystalline region in a time-temperature-transformation (TTT) diagram of the bulk solidifying amorphous alloy.

13. The method of claim 1, wherein the imprinted pattern comprises a hologram.

14. An apparatus comprising:
a mold defining a pattern of micro-scale or smaller features; and
a heating system configured to heat the mold to a temperature at or above a glass transition temperature (Tg) and below a melting temperature (Tm) of a bulk solidifying amorphous alloy; wherein
the apparatus is configured to:
place the heated mold in contact with an article comprising the bulk solidifying amorphous alloy at a temperature below Tg to locally heat the article so that a depth less than a complete thickness of the article is heated to at least Tg and a remainder of the article remains below Tg; and
imprint the pattern on the article.

15. The apparatus of claim 14, wherein the mold comprises a negative image of the pattern.

16. The apparatus of claim 14, wherein the apparatus is configured to maintain a temperature of a portion of the article at ambient temperature.

17. The apparatus of claim 14, further comprising a force applicator configured to force the mold against the article to imprint the pattern on the article.

18. The apparatus of claim 17, wherein:
the apparatus is further configured to cool the locally heated portion of the article below Tg after imprinting the pattern; and
the force applicator is further configured to force the mold against the article during cooling of the locally heated portion of the article.

19. A method comprising:
heating a mold defining a negative image of a pattern to a temperature at or above a glass transition temperature (Tg) and below a melting temperature (Tm) of a bulk solidifying amorphous alloy;
placing the heated mold and an article at temperature below Tg and comprising the bulk solidifying amorphous alloy in contact with each other, thereby locally heating a surface portion of the article to at least a temperature above Tg and below a crystallization temperature (Tx) of the bulk solidifying amorphous alloy through transfer of thermal energy from the mold; and
embossing the pattern on the surface portion of the article while maintaining a temperature of another portion of the article below Tg, the pattern including microsized features, nanosized features, or a combination thereof.

20. The method of claim 19, wherein the bulk solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

21. The method of claim 20, wherein the embossing is conducted in air.

22. The method of claim 19, wherein the pattern forms a hologram.

23. The method of claim 22, wherein the article comprises an enclosure for an electronic device.

24. The method of claim 22, wherein the article comprises a cell phone or a computer.

25. The method of claim 19, wherein the surface portion of the article is at ambient temperature before being locally heated.

* * * * *